Aug. 4, 1970     H. E. BADER     3,522,919

BAGGAGE CONTAINER HANDLING SYSTEM

Filed June 5, 1968

INVENTOR.

HOWARD E. BADER

BY

-AGENT-

United States Patent Office 3,522,919
Patented Aug. 4, 1970

3,522,919
BAGGAGE CONTAINER HANDLING SYSTEM
Howard E. Bader, Long Beach, Calif., assignor to McDonnell Douglas Corporation, a corporation of Maryland
Filed June 5, 1968, Ser. No. 734,788
Int. Cl. B60p *3/00;* B64c *1/22*
U.S. Cl. 244—137          1 Claim

ABSTRACT OF THE DISCLOSURE

A conveyor system for a longitudinal body element of a vehicle in which there is a central side opening therein through which the cargo must be loaded or unloaded, a conveyor system which includes a power operated shuttle assembly located directly adjacent the opening which is capable of cooperating with a first cargo container and moving it in one direction and then cooperating with a subsequent cargo container and moving it in the opposite direction without any lost movement.

BACKGROUND OF THE INVENTION

This invention relates to vehicles, and specifically to transport airplanes. Such airplanes may be either the passenger carrying type or the exclusively cargo carrying type. In either case the airplane has an air pressurized cargo space in the lower portion or belly of the fuselage. This cargo space usually loosely carries a large number of separate items of cargo, such as passenger baggage air express parcels, etc. Usually these smaller items are individually stored by hand in the cargo space through side openings therein. To do such requires substantial time and labor to load and unload the belly spaces of large, modern transport airplanes. As aircraft are getting larger to where several hundred passengers can be carried per aircaft, the time and labor to load and unload passenger baggage is becoming a major problem. Naturally, it is desirable to decrease as much as possible the non-flying time of the aircraft, and if minutes are lost on the ground a proportional loss in passenger fares is caused. It is also desirable to decrease the time in which a passenger must spend in an airport terminal. Usually a passenger must arrive at the terminal at least 30 minutes before flight time in order for the baggage to be loaded on the airplane and a similar amount of time is wasted for the passenger to obtain his luggage upon arrival.

Heretofore, there has been an attempt to design an automated passenger baggage handling system to facilitate loading and unloading of passenger baggage. This system is a power driven chain system which is designed within the floor portion of the belly of the aircraft fuselage. This claim system operates to place containers containing passenger baggage. However, the complexity of the control portion of this chain system has caused many malfunctions.

It would be desirable to design an aircraft passenger baggage handling system which is capable of loading and unloading passenger baggage in a relatively short period of time. It is desirable that the handling system facilitate the return of baggage to each passenger as soon as possible after arrival.

SUMMARY OF THE INVENTION

The apparatus of this invention provides basically for a shuttle assembly located within the floor element adjacent the access opening into the belly of the aircraft. The shuttle assembly is designed to cooperate with a container transversely with respect to the opening and longitudinally within the aircraft fuselage. The shuttle assembly moves between a first position and a second position. With the assembly in the first position when activated, it moves the container in one direction within the aircraft fuselage. Upon completion of this movement, which in effect removes the container from the area of the opening and moves it into the fuselage, the shuttle is now located in the second position. Upon placement of another baggage container in cooperation with the assembly, that container is moved in a direction opposite to which the first container was moved until it is displaced from the access opening. Upon placement of another container in cooperation with the shuttle assembly, the assembly moves the container in the same direction as the first container was moved and in the same manner, this container contacting the first container and as a result displacing of each container is effected along the fuselage of the aircraft.

It is felt from the foregoing that the objects of this invention have been defined sufficiently so as to not warrant specific enumeration. However, further objects and advantages of the invention will become apparent from the following specification taken in conjunction with the accompanying drawing.

DETAILED DESCRIPTION OF THE SHOWN EMBODIMENT

Figure 1:
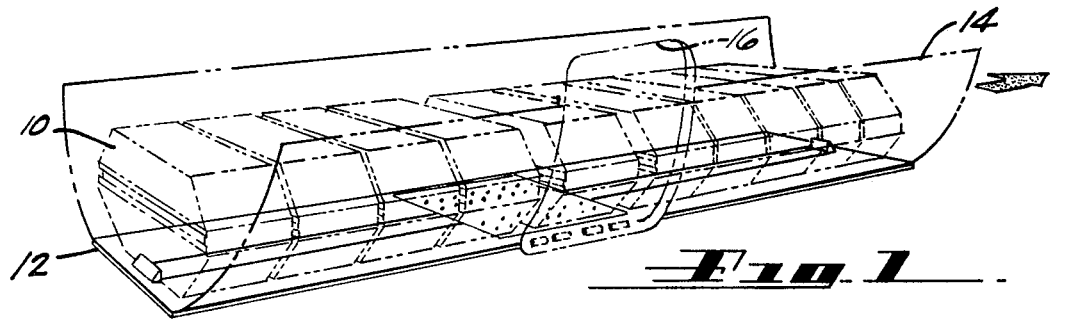
FIG. 1 is a diagrammatic view showing the alignment of a plurality of baggage containers as they would be placed within the fuselage of an aircraft.

Referring to the drawing, there is shown in FIG. 1 a plurality of baggage containers 10 which are supported in an in-line relationship on a floor 12 which is located within the belly of an aircraft fuselage 14. A door 16 is provided within the side of the fuselage 14 to permit deposit and withdrawal of the containers 10.

Figure 4:
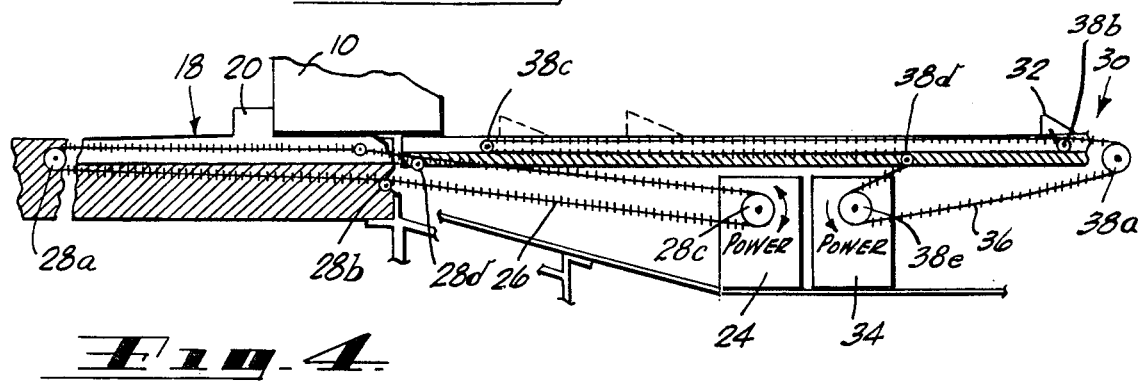
FIG. 4 is a sectional view showing the embodiment of the mechanism to deposit baggage containers within the fuselage of the aircraft.

A power operated shuttle assembly 18, shown in FIG. 4, is mounted directly adjacent door 16 within the aircraft fuselage 14. Shuttle assembly 18 includes a cross-arm 20. Shuttle assembly 18 is movable longitudinally within the door area, that is, along the longitudinal axis of the fuselage 14. Each of the containers 10 are designed to cooperate with the shuttle assembly 18. If a container is located on the fore side of the cross-arm 20, the shuttle assembly is capable of moving the container forwardly within the aircraft fuselage 14. Likewise, if the container is located on the aft side of cross-arm 20, the shuttle assembly 18 is capable of moving the container in the aft direction within the aircraft fuselage 14. The movement of shuttle assembly 18 is such that if it has moved to displace a container forwardly it is ready to receive an additional container for its movement in the aft direction. No movement of the shuttle assembly 18 is necessary to locate it in such a position as to effect its cooperation with another container.

Shuttle assembly 18 is to be operated by means of a power source 24. Power source 24 is shown to be an electrical motor, however, any other power source may be employed. Power source 24 effects movement of shuttle assembly 18 through chain 26. The correct alignment of chain 26 is effected through pulleys 28a, 28b, 28c and 28d.

Figure 3:
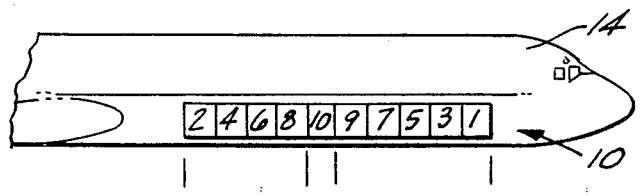
FIG. 3 is a diagrammatic view depicting the loading sequence of baggage containers within the fuselage of the aircraft.

Once the aircraft fuselage is fully loaded as shown in FIG. 3. In order to unload, the disclosed claw/shuttle mechanism moves the containers up in alignment with door 16 as each of the containers is removed from the aircraft. The mechanism to effect such alignment movement of the containers is a transporter assembly 30. Within each baggage compartment where there is a side opening door 16 employed at approximately the midpoint of the compartment, such transporter mechanisms are to be placed within each compartment, one at the fore end of the compartment and one at the aft end of the compartment. Transporter mechanism 30 includes a pawl 32 which is capable of cooperating with a container 10. Pawl 32 is movable longitudinally within the fuselage by means of a power source 34 which operates through a chain drive 36. The alignment of the chain drive 36 is maintained due to pulleys 38a, 38b, 38c, 38d and 38e.

Figure 2:
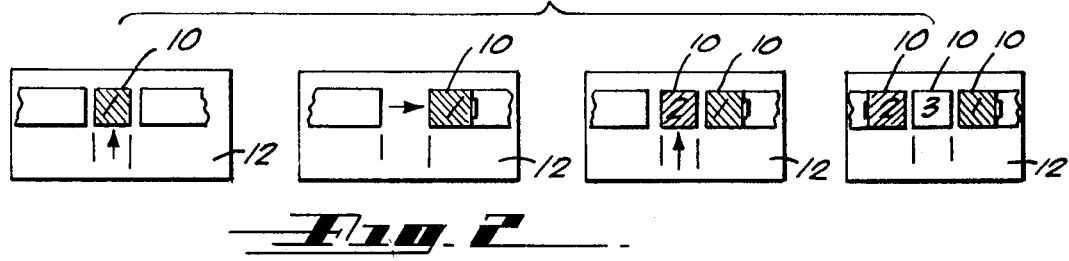
FIG. 2 is a diagrammatic view illustrating the loading procedure of the baggage containers shown in FIG. 1.

The operation of the apparatus of this invention is as follows: Referring to FIGS. 2 and 3 of the drawing, the first container 10 is placed within the aircraft fuselage 14 through door 16. The container is displaced in a fore direction, to the right in these views, from the door area by means of cross-arm 20 of shuttle assembly 18. A second container is placed within the door area of fuselage 14 and in a cooperative relationship with cross-arm 20 of shuttle assembly 18. Shuttle assembly 18 then effects movement of the second container in an aft direction. A third container is then brought within the door area of the fuselage 14 and is displaceable by the shuttle assembly 18 forwardly. Container 3 contacts container 1 and the shuttle assembly 18 effects displacement of both simultaneously. The entire baggage compartment of the aircraft is loaded in a similar manner until all of the available space within the baggage compartment is taken up. Referring to FIG. 3 of the drawing, the door area is located adjacent container 10 with the odd numbered containers being located forwardly thereof and the even numbered containers being located in an aft direction thereof.

While the invention has been described in one embodiment in one employment, it is to be understood that the words which have been used are words of description rather than of limitation and that changes within the scope of the appended claim may be made without departing from the true scope and spirit of the invention in its broader aspects.

I claim:
1. In an aircraft having a fuselage with a passenger floor and a belly cargo space constituting a compartment between the floor and the belly skin, said belly cargo space being capable of retaining a plurality of cargo containers, a door providing access to said belly cargo space at its approximate midpoint, said door permitting substantial horizontal entry and withdrawal of said cargo containers, a container handling system comprising:

a reciprocating shuttle assembly located within said belly cargo space and adjacent said door, said shuttle assembly being movable longitudinally along said fuselage between a first and a second position, said shuttle assembly including engaging means having a centrally positioned cross-arm to cooperate with each of said cargo containers upon movement of said shuttle assembly from said first position to said second position, said cross-arm moving said cargo container from the door area forwardly within said cargo space upon movement of said shuttle assembly from said second position to said first position, said cross-arm moving a second said cargo container from the door area rearwardly within said cargo belly space; and a transporter assembly being located within said belly cargo space adjacent the fore and aft ends thereof, said transporter assembly comprising first and second transport mechanisms, said transport mechanisms being capable of moving said cargo containers adjacent said engaging means.

References Cited

UNITED STATES PATENTS 2,703,653 3/1955 Thomson.
3,250,408 5/1966 Daniluk et al.
3,356,236 12/1967 Shaw et al.

ALBERT J. MAKAY, Primary Examiner

U.S. Cl. X.R.

198—24, 75, 221; 214—38, 516